United States Patent [19]

Exton

[11] Patent Number: 4,624,561
[45] Date of Patent: Nov. 25, 1986

[54] VIBRATION-FREE RAMAN DOPPLER VELOCIMETER

[75] Inventor: Reginald J. Exton, Williamsburg, Va.

[73] Assignee: The United States of America as represented by the Adminstrator of the National Aeronautics and Space Adminstration, Washington, D.C.

[21] Appl. No.: 727,034

[22] Filed: Apr. 25, 1985

[51] Int. Cl.[4] .............................. G01P 3/36; G01J 3/44
[52] U.S. Cl. ...................................... 356/28.5; 356/301
[58] Field of Search ...................... 356/28.5, 301, 318, 356/342

[56] References Cited

U.S. PATENT DOCUMENTS

| | | |
|---|---|---|
| 3,540,801 | 11/1970 | Schmidt . |
| 3,625,613 | 12/1971 | Abell et al. .......................... 356/301 |
| 4,026,655 | 5/1977 | Gunter, Jr. . |
| 4,176,950 | 12/1979 | Franke . |
| 4,193,690 | 3/1980 | Levenson et al. ................... 356/301 |
| 4,483,614 | 11/1984 | Rogers ................................ 356/301 |
| 4,505,586 | 3/1985 | Tochigi et al. ...................... 356/301 |

FOREIGN PATENT DOCUMENTS 0205827 11/1983 Japan .................................... 356/301

OTHER PUBLICATIONS

Y. Vasilenko et al, Opt. Spectrosc., vol. 41, No. 1, Jul. 1976, p. 73.
J. Oldengarm et al, Optics & Laser Tech, Dec. '73, vol. 5, No. 6, p. 249.

Primary Examiner—Stephen C. Buczinski
Attorney, Agent, or Firm—William H. King; Howard J. Osborn; John R. Manning

[57] ABSTRACT

Method and apparatus unaffected by vibrational environments for obtaining measurements using Raman Doppler Velocimetry. Two laser beams, a pump beam 18 and a probe beam 22 are focused by a lens 21 to a point 25 in a flow 11. A lens 26 collimates the two beams. A beam splitter 27 dumps beam 18 and beam 22 is reflected by a corner cube 28 back to lens 26. Lens 26 then focuses the beam back to point 25. The reflected beam 22 and the backward and forward scattering at point 25 are detected by a detector 30 and processed by a boxcar averager 31. The lens 26 and corner cube 28 combination, called a retrometer 29, ensure that the measurements are unaffected by vibrations.

14 Claims, 3 Drawing Figures

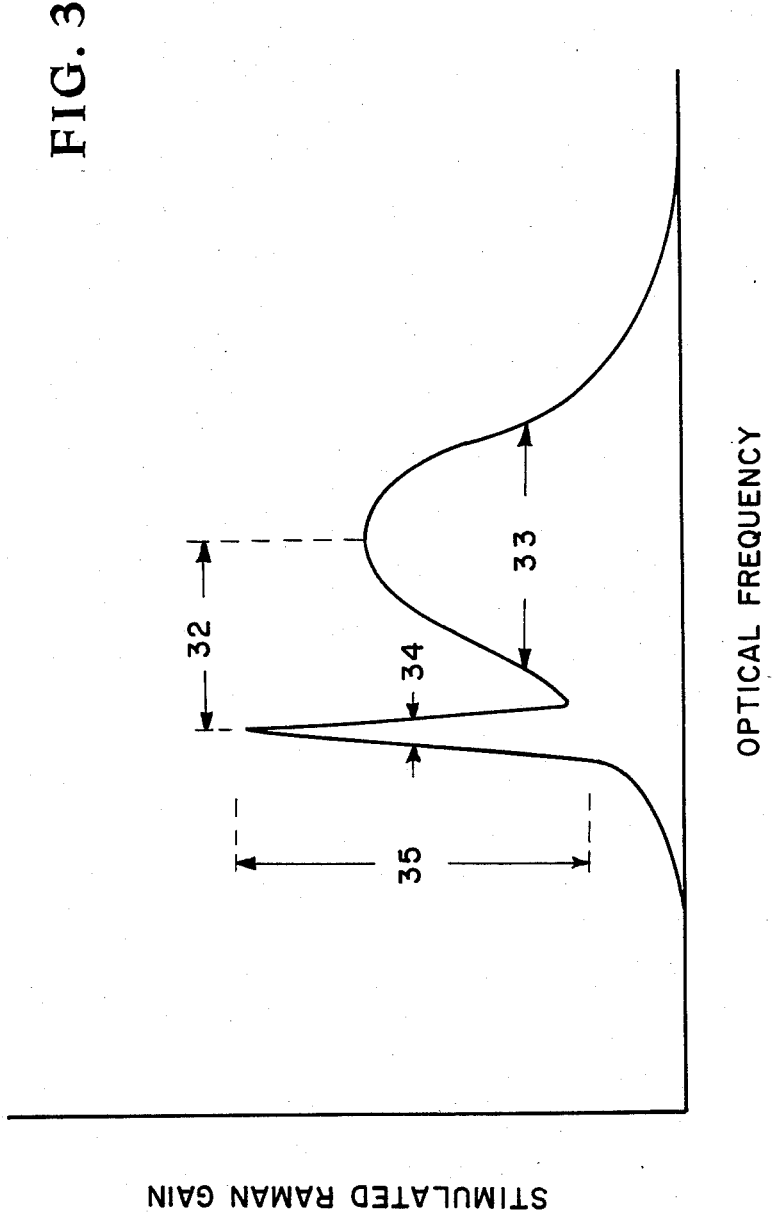

VIBRATION-FREE RAMAN DOPPLER VELOCIMETER

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

Laser Doppler Velocimetry (LDV) has been utilized extensively in the past for measuring flow velocities by tracking particles seeded into the flow. The seeding requirement, however, is often undesirable and sometimes impractical (e.g., flames). In aerodynamic research, strong velocity gradients (e.g., shock waves, vortex flows) make it difficult for the particle to track the flow due to the large inertia of the particle relative to the molecules. The resulting particle lag represents a severe limitation to the application of LDV techniques at supersonic speeds. Seeding of particles into specific regions of interest is also very difficult. For example, seeding into the center of a vortex flow is hampered by the centrifugal forces experienced by the particles which render the vortex center void of particles. A new technique is presently being used to measure the flow velocity of the molecules directly using non-intrusive laser techniques. In the following, this evolving new technique for a molecular flow velocimeter will be described.

The concept utilizes the Raman scattering of light from specific molecules in the flow (e.g., $N_2$, $O_2$, $H_2$). If the molecules are moving, the scattered light also exhibits a shift in frequency due to the Doppler effect. The shift in the Raman spectra can, therefore, be directly related to the velocity of the molecules. The intensity distribution in the Raman spectrum could also be used to obtain the temperature and density of the gaseous molecules. Spontaneous Raman spectroscopy (single laser) could in principle be used for this purpose, but weak signals and inadequate spectrometer resolution normally preclude such a measurement. The use of coherent, stimulated Raman spectroscopy, however, increases the signal by orders of magnitude and has a considerably higher resolution due to the inherently narrow line widths associated with lasers.

In one version of coherent Raman spectroscopy, called stimulated Raman gain spectroscopy (SRGS), two lasers interact with the molecules and the difference in frequency between these lasers is adjusted to be in resonance with a Raman shift exhibited by a specific molecule. Many geometrical arrangements can be envisioned for these two lasers. Two configurations, however, define the limits to their interactions with the molecules-namely, forward and backward scattering. In forward scattering, both laser beams co-propagate from the same direction; whereas in backward scattering, the laser beams are in a counter propagating configuration.

A typical set-up in SRGS involves a probe laser (usually a C.W. laser) and a pump laser (usually a high power pulsed laser). One of these lasers is tunable in frequency in order for the two lasers to come into Raman resonance with a particular molecule. Both lasers are tightly focused at the same point in space (typically 50-100 micron diameter) and the stimulated Raman interaction takes place only over a very small volume of space. In the SRGS set-up just described, a change (gain) in the probe intensity takes place only during the brief time (typically 10 nano-seconds) that the pump beam is present in the interaction volume. This change is sensed by focusing the probe beam on a detector and monitoring its output with high speed electronics. In both the forward and backward scattering cases, a double-ended configuration has been employed. In the forward scattering case, the detector is mounted on the opposite side of the interaction volume from the two lasers. In the backward scattering case, the detector is mounted on the table supporting the pump laser while the probe laser is mounted on the opposite side of the interaction volume. In the forward scattering case, the moving molecules "see" two laser beams whose frequencies are shifted in the same spectral direction and by about the same amount; hence there is very little Doppler shift (and breadth) by which to measure velocity. In the backward scattering case, on the other hand, the molecules "see" one laser beam shifted in one spectral direction while the other laser beam is shifted in the opposite direction. This results in a large Doppler shift (and breadth) which is considerably easier to measure. For $N_2$ molecules, a Nd:Yag laser pump (532 $\eta$m) and a dye laser probe (607 $\eta$m) render backward scattering shifts fifteen times that observed in forward scattering. The ratio of Doppler shift to breadth, however, is actually the same in both cases, but the larger shift exhibited in backward scattering is easier to measure since it relaxes the stability and line width requirements placed on the lasers.

This concept for measuring molecular velocities has been demonstrated in the laboratory over the past several years. However, in both the forward and backward scattering cases, the double-ended configuration requires tightly focused laser beams and would be impossible to apply in severe vibrational environments, such as wind tunnels.

Thus, an object of the present invention is to provide a method and apparatus for making accurate measurements in a flow volume using SRGS that are unaffected by severe vibrational environments, such as wind tunnels.

A further object of the invention is to provide a method and apparatus for attaining overlap of two counter propagating beams emanating from the same side of a flow volume thereby providing accurate backward scattering measurements in the flow volume.

Another object of the invention is to provide a method and apparatus utilizing only two beams to produce both forward and backward scattering of light in a flow volume.

Other objects and advantages of the present invention will be readily apparent from the following description and drawing which illustrates a preferred embodiment of the present invention.

SUMMARY OF THE INVENTION

A pump laser beam and a probe laser beam are combined on one side of a flow volume and then focused by a first lens to a point in the flow volume. The light on the other side of the flow volume is collimated by a second lens and then only the probe laser beam is reflected back by a corner cube to the second lens. The second lens focuses the reflected beam back to said point in the flow. The resulting light at said point is received by said first lens which collimates it and applies it to a detector. The resulting light at said point includes the reflected probe beam, backward scattering caused by the pump beam and the reflected probe beam, and forward scattering caused by the pump beam and the probe beam before it is reflected. With the use of the second lens and corner cube combination, there is complete overlapping of the reflected probe beam and the pump beam even in severe vibrational environments. Consequently, stimulated Raman gain spectroscopy is provided that is accurate in severe vibrational environments.

BRIEF DESCRIPTION OF THE DRAWINGS

FIG. 3 is a typical spectral scan exhibiting the Doppler shift experienced by the forward and backward scattering.

DETAILED DESCRIPTION OF THE PREFERRED EMBODIMENT

Figure 1:
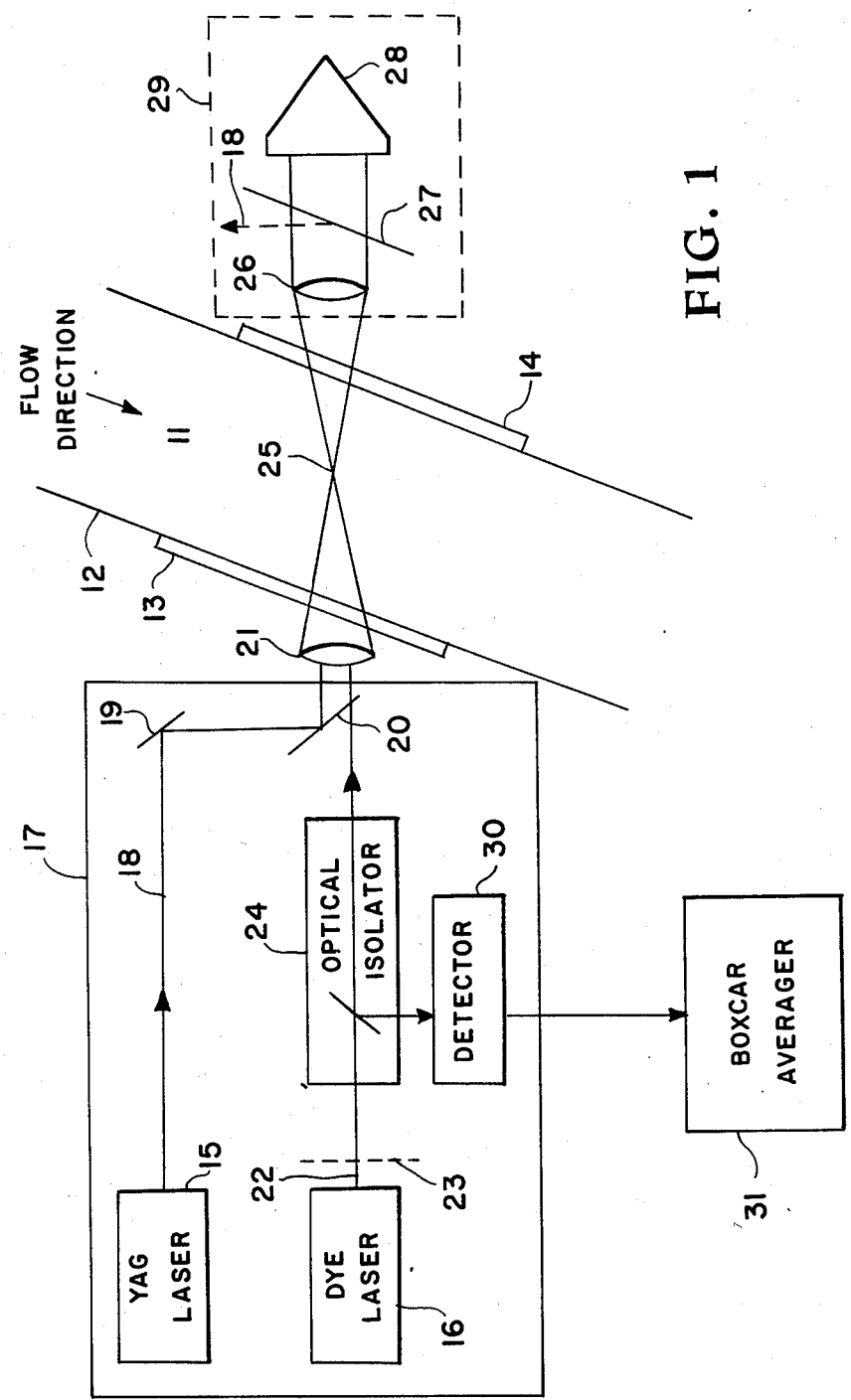
FIG. 1 is a schematic diagram of a vibration-free Raman Doppler Velocimeter in accordance with the present invention.

Turning now to the embodiment of the invention selected for illustration the number 11 in FIG. 1 of the drawings designates flow in, for example, a wind tunnel 12. Two windows 13 and 14 are on opposite sides of the wind tunnel 12 for viewing the flow 11. On one side of the wind tunnel a pump Yag laser 15 and a frequency tunable probe dye laser 16 are placed on a table 17. The beam 18 from the pump laser 15 is directed into a mirror 19 which reflects the beam onto a beam splitter 20 which reflects the beam onto a lens 21. The beam 22 from probe laser 16 is passed through a chopper 23, an optical isolator 24 (Faraday rotator) and beam splitter 20 to lens 21. The purpose of mirror 19 and beam splitter 20 is to combine the two beams, however, this could be done by other means without departing from the invention.

Lens 21 focuses the two combined beams through window 13 to a point 25 in the flow. After passing through point 25 the combined beams pass through window 14 to a lens 26. Lens 26 collimates the two beams and directs them onto a dichroic beam splitter 27. Lasers 15 and 16 generate different colored beams such that beam splitter 27 will reflect beam 18 from pump laser 15 and will transmit the probe laser beam 22. Consequently, beam 18 is dumped and is no longer in the system. Other means such as for example a spectral absorber could be used for this purpose. The collimated beam 22 transmitted through beam splitter 27 is directed onto a corner cube reflector 28 which reflects the collimated beam back through beam splitter 27 to lens 26. Lens 26 focuses the returning beam back through window 14 to point 25.

The combination of the lens 26 and corner cube 28 is designated as a retrometer 29. With this combination, the retro-reflected beam 22 is brought to the same focus point 25 as the forward directed beams 18 and 22. This situation is obtained since a corner cube sends light back in the same direction from whence it came. Lens 26 is used to render a collimated (parallel) beam incident on the corner cube. This combination renders the desired focus point (within optical tolerances set by the individual components) for the retro-reflected beam 22. The result is that the retro-reflected focus point 25 is practically independent of lateral or rotational movements of the retrometer 29. In this manner, counter-propagating, focused beams are easily attained with the simple requirement that the forward probe beam strikes the retrometer. In this configuration, the retrometer can be moved (shaken) relative to the laser table 17, but this motion will not impact the overlapping of the two counter-propagating beams 18 and 22. Vibration-free overlap of the two counter propagating beams is, therefore, attained.

Figure 2:
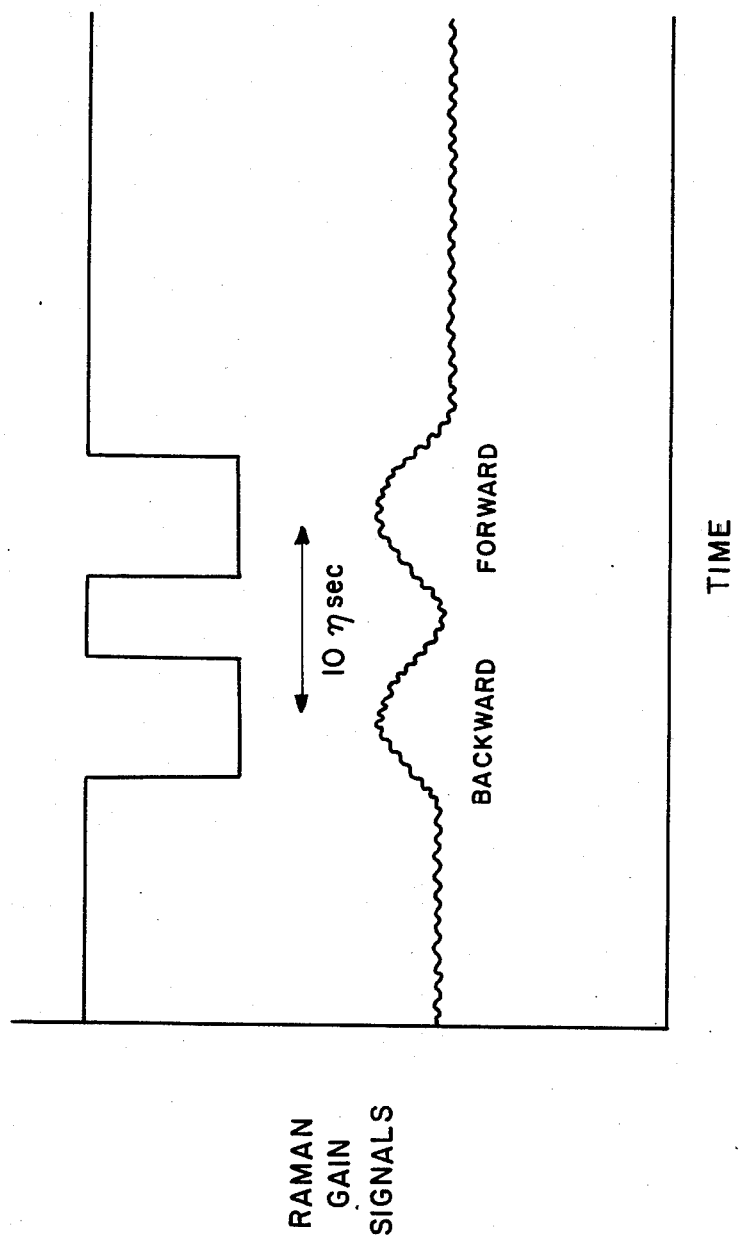
FIG. 2 is a graph depicting the forward and backward scattered signal gains with respect to time.

Using the retrometer 29 set-up, both the probe and pump beams could be retro-reflected. For simplicity, however, it will be assumed that the pump beam 18 is dumped at the retrometer by beam splitter 27. On return to the optical table, the probe beam 22 is intercepted by optical isolator 24 which efficiently directs the returned probe beam to detector 30 (the isolator also prevents the beam from reentering the laser 16 and creating stability problems). The retro-reflected probe beam is then analyzed with a high speed electronic system (e.g., boxcar averager 31) which measures the change (gain or loss) in the probe beam that occurs during the pulse duration of the pump laser. If one of the lasers is frequency tunable, for example laser 16, the amount of the Doppler shift can be measured by scanning this laser and noting the point at which the frequency difference between the lasers again comes into Raman resonance with the moving molecules. Thus far, it has been implied that analysis of the probe beam in the retrometer configuration yields information only about the counterpropagating interaction. Actually, the pump beam 18 simultaneously interacts with the probe beam 22 in both the forward and backward directions. The detector 30 will first see a singal (gain/loss) from the backward scattering case, followed by a signal from the forward scattering case. This latter signal will be observed at a later time given by the round-trip time for the probe beam to travel from the focus point to the retrometer and back. Since the speed of light is approximately 1 foot per nanosecond and since the round-trip distance is typically 10 feet, this delay is about 10 $\eta$sec-easily discriminated with boxcar averager 31 (see FIG. 2). Thus an additional advantage of the retrometer configuration is the near simultaneous observation of both the forward and backward scattering. In this mode, the forward scattered spectrum (obtained from second signal in FIG. 2) is essentially unshifted with respect to the backward scattered spectrum and provides a nearly zero shift frequency reference. In other words, there is no requirement in this set up for an absolute frequency reference.

A typical spectral scan in which the two boxcar outputs are summed exhibits the properties shown in FIG. 3. The backward scattered spectrum (obtained from first signal in FIG. 2) exhibits a large Doppler shift and breadth. The shift 32 of the backward scattered peak with respect to the forward peak is a measure of the molecular velocity. It is also possible to measure the translational temperature of the gas by measuring the breadth 33 (predominantly Doppler broadened) of this backward scattered line. This temperature measurement also results from a frequency measurement and is a more desirable measurement than recording the intensity distribution among several peaks. Finally, the breadth 34 of the forward scattered line can be related to the pressure of the gas, since pressure broadening generally dominates over Doppler broadening in this case. Thus the use of a retrometer in the manner described results in a vibration-free molecular velocimeter in which both forward and backward scattering can be observed simultaneously—with the result that non-intrusive, point measurements of velocity, temperature, and pressure can be obtained using a single optical system. The density of the specific gas in the flow being analyzed could also be obtained with calibration from the integrated area (or peak intensity) under either peak in FIG. 3. (e.g. 35)

The above described description and drawings are only illustrative of preferred embodiments which achieve the objects, feature, and advantages of the present invention, and is not intended that the present invention is limited thereto.

Alternate embodiments of this technique include application of other coherent Raman techniques such as inverse Raman Spectroscopy, IRS, in which a loss of signal is recorded in the probe beam. Another embodiment would provide for retro-reflection of both probe and pump beams. No additional thermodynamic information would be obtained, but it would contain redundant shift data which may be useful and also some additional velocity vector directions.

The invention might also use geometrical arrangements intermediate between the (0°) forward and (180°) backward scattering arrangements. Intermediate arrangements can be used to obtain velocity components along directions other than the laser directions. For example, two beams intersecting at an angle can yield 2-D information in the plane of the lasers. Forward scattering is particularly useful in this regard since it is more sensitive to velocity components away from the laser directions. Addition of a third beam out of the plane can be used to generate a 3-D velocity vector. The backward scattering can still be used in these configurations to obtain higher sensitivity to a particular velocity component and also gas temperature as before. In this arrangement, the retrometer would be employed with the probe beam, while the pump beam(s) intersect the sensing volume at some angle. If more than one pump beam is employed for n-D configurations, a time delay in their arrival would make for easy detection.

Finally, the use of outgoing and retro-reflected signals, both measured here with the optical isolator, might be used to measure the two-way transmittance of a medium. Corner cubes are routinely used by themselves for this type of measurement.

The advantages of the present invention are numerous. It is especially useful as a velocimeter in vibrational environments as the retrometer configuration effectively reduces a normally double-ended system to a single-ended system. The retrometer must still be placed on the opposite side of the test region, but its lateral position and angular orientation is not critical to the operation. The retrometer arrangement, along with a high speed electronic detection system also allows the measurement of both the forward and backward scattering. In one mode of operation, the forward scattering provides a frequency reference by which the shift of the backward scattered spectrum can be measured. In another mode, the forward scattering itself (still detected using the retrometer) in conjunction with crossed laser beams could be used to obtain velocity components. This mode would require a separate absolute frequency reference and very stable and narrow lasers. The forward and backward scattering line breadths would, in all modes, be available for measuring pressure and temperature, respectively, using standard line shape analysis techniques.

What is claimed is:

1. A method for utilizing stimulated Raman gain spectroscopy to make measurements in a flow volume comprising the steps of:
    combining a pump laser beam and a probe laser beam on one side of said flow volume;
    focusing the combined beams to a point in said flow volume;
    intercepting the combined beams on the other side of said flow volume and reflecting said probe beam back to said point in said flow volume; and
    detecting on said one side of said flow volume the resulting light at said point in said flow volume whereby the measurements of the detected light are unaffected by vibration environments.

2. A method according to claim 1 wherein said step of reflecting said probe beam back to said point in said flow volume includes the steps of collimating said probe beam, reflecting the collimated probe beam back on itself, and focusing the reflected probe beam back to said point in said flow volume.

3. A method according to claim 2 wherein said step of collimating said probe beam includes the steps of collimating said pump beam and said probe beam and then dumping said pump beam.

4. Method according to claim 1 wherein the light detected at said point in said volume includes backward scattering caused by the interaction of the pump beam and the reflected probe beam, and the reflected probe beam accompanied with forward scattering caused by the interaction of the pump beam and the unreflected probe beam.

5. A method unaffected by vibrational environments for measuring velocity, temperature, and pressure at a point in a flow volume using non-intrusive laser techniques to create the Raman scattering of light from specific molecules in said flow volume comprising the steps of:
    focusing first and second laser beams from the same side of said flow volume to a predetermined point in said flow volume thereby creating forward scattering of light at said point;
    reflecting said first laser beam at the opposite side of said flow volume back to said same predetermined point thereby creating backward scattering of light at said point: and
    measuring the Doppler shift in optical frequency between said forward and backward scattering on the focusing side of said flow volume wherein said Doppler shift and breadth is indicative of said velocity, temperature, and pressure at said point in said flow volume.

6. Apparatus utilizing stimulated Raman gain spectroscopy for making measurements in a flow volume comprising:
    a pump laser and a probe laser on one side of said flow volume;
    means for combining the beams from the two lasers and focusing the combined beams to a point in said flow volume;
    means on the other side of said flow volume for collimating said probe beam;
    means for reflecting the collimated probe beam back in the same direction from whence it came;
    means for focusing the reflected probe beam to said point in said flow volume; and
    means on said one side of said flow volume for detecting the resulting light at said point in said flow volume whereby any measurements made of the detected light are unaffected by vibrational environments.

7. Apparatus according to claim 6 wherein said means for collimating said probe beam comprises lens means for collimating said pump beam and said probe beam and means for dumping said pump beam.

8. Apparatus according to claim 7 wherein said means for reflecting the collimated probe beam is a corner cube.

9. Apparatus according to claim 8 wherein said means for focusing the reflected probe beam to said point in said flow volume is said lens means.

10. Apparatus unaffected by vibrational environments for measuring velocity, temperature, and pressure at a predetermined point in a flow volume comprising:
- a means for focusing first and second laser beams to a predetermined point in said flow volume when both lasers are located on the same side of said flow volume;
- a means for reflecting said first laser beam at the opposite side of said flow volume back to said same predetermined point in said flow volume; and
- a means for measuring the change in said first laser beam at the focusing side of said flow volume that occurs during the interaction of said first and second laser beams wherein said change is indicative of velocity, temperature, and pressure at said predetermined point.

11. Apparatus as in claim 10 wherein said first laser beam is produced by a probe laser and said second laser beam is produced by a pump laser.

12. Apparatus as in claim 10 wherein said means for focusing comprises a convex lens having a focal length substantially equal to its distance from said predetermined point such that said first and second laser beams interact at said predetermined point.

13. Apparatus as in claim 10 wherein said means for reflecting said first laser beam at said opposite side of said flow volume includes:
- a convex lens for collimating said first and second laser beams;
- a beam splitting means for dumping said second beam after it is collimated; and
- a corner cube responsive to said first beam such that said first beam is reflected back and focused by said convex lens to said same predetermined point in said flow volume.

14. Apparatus as in claim 10 wherein said means for measuring the change in said first laser beam includes:
- a means for detecting the reflected first laser beam; and
- a high speed electronic means to measure said change.

* * * * *